United States Patent
Venkatasubramanian et al.

(10) Patent No.: US 9,514,059 B2
(45) Date of Patent: Dec. 6, 2016

(54) HIDING PAGE TRANSLATION MISS LATENCY IN PROGRAM MEMORY CONTROLLER BY SELECTIVE PAGE MISS TRANSLATION PREFETCH

(71) Applicant: Texas Instruments Incorporated, Dallas, TX (US)

(72) Inventors: Ramakrishnan Venkatasubramanian, Plano, TX (US); Oluleye Olorode, Garland, TX (US); Bipin Prasad Heremagalur Ramaprasad, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 77 days.

(21) Appl. No.: 14/579,654

(22) Filed: Dec. 22, 2014

(65) Prior Publication Data
US 2016/0179700 A1    Jun. 23, 2016

(51) Int. Cl.
*G06F 12/00*    (2006.01)
*G06F 12/10*    (2016.01)

(52) U.S. Cl.
CPC ... *G06F 12/1045* (2013.01); *G06F 2212/1021* (2013.01); *G06F 2212/50* (2013.01); *G06F 2212/654* (2013.01); *G06F 2212/681* (2013.01)

(58) Field of Classification Search
CPC .................. G06F 12/1045; G06F 2212/1021; G06F 2212/50; G06F 2212/65
USPC .................................................. 711/200–205
See application file for complete search history.

(56) References Cited

U.S. PATENT DOCUMENTS

| | | | |
|---|---|---|---|
| 5,778,434 A | 7/1998 | Nguyen et al. | |
| 6,487,640 B1 | 11/2002 | Lipasti | |
| 6,957,315 B2 | 10/2005 | Chauvel | |
| 7,054,927 B2 * | 5/2006 | Ulrich | G06F 17/30067 707/999.102 |
| 2012/0198164 A1 | 8/2012 | Damodaran et al. | |
| 2014/0115294 A1 * | 4/2014 | Fleischer | G06F 12/08 711/204 |

OTHER PUBLICATIONS

PCT Search Report for Application No. PCT/US 2015/067525, dated Jun. 2, 2016.

* cited by examiner

*Primary Examiner* — Matthew Bradley
(74) *Attorney, Agent, or Firm* — Robert D. Marshall, Jr.; Frank D. Cimino

(57) ABSTRACT

This invention hides the page miss translation latency for program fetches. In this invention whenever an access is requested by CPU, the L1I cache controller does a-priori lookup of whether the virtual address plus the fetch packet count of expected program fetches crosses a page boundary. If the access crosses a page boundary, the L1I cache controller will request a second page translation along with the first page. This pipelines requests to the μTLB without waiting for L1I cache controller to begin processing the second page requests. This becomes a deterministic prefetch of the second page translation request. The translation information for the second page is stored locally in L1I cache controller and used when the access crosses the page boundary.

18 Claims, 12 Drawing Sheets

HIDING PAGE TRANSLATION MISS LATENCY IN PROGRAM MEMORY CONTROLLER BY SELECTIVE PAGE MISS TRANSLATION PREFETCH

TECHNICAL FIELD OF THE INVENTION

The technical field of this invention is digital data processing and more specifically address translation.

BACKGROUND OF THE INVENTION

In a processor supporting virtual memory, the virtual address provided by the CPU has to be translated to a physical address. This is typically accomplished by a Memory management unit (MMU). The MMU typically uses a µTLB (micro-translation look-aside buffer) as a cache of the address translation entries stored in the MMU. Such address translation entries are typically organized based upon memory pages. Every virtual address requested by CPU needs to be translated to the physical address by the µTLB/MMU for memory access. This is typically performed on page boundaries. If the series of program fetches cross a boundary into the next page, then the next address translation entry is needed for virtual to physical address translation. If this next address translation entry is not in the µTLB, it must be requested from the MMU. This translation data fetch may take tens to hundreds of cycles depending on the page translation and page table walk latency in the MMU.

SUMMARY OF THE INVENTION

This invention hides the page miss translation latency for such program fetches. In this invention whenever an access is requested by CPU, the L1I cache controller does a-priori lookup of whether the virtual address plus the fetch packet count crosses a page boundary. If the access crosses a page boundary, the L1I cache controller will request a second page translation along with the first page. This pipelines requests to the µTLB without waiting for L1I cache controller to begin processing the second page requests. This becomes a deterministic prefetch of the second page translation request. The translation information for the second page is stored locally in L1I cache controller and used when the access crosses the page boundary.

In this invention the digital signal processor (DSP), a program cache memory controller (L1I controller), and a CPU to L1I cache interface provides the virtual address and the number of fetch packets from that virtual address. This number of fetch packets to be accessed is generally based on the branch prediction architecture. The L1I cache controller unrolls the sum of the virtual address and the fetch packet count into corresponding fetch packet requests and prefetches these fetch packets to L1I cache. In the typical prior DSP L1I cache controller, the L1I cache is a virtually indexed, virtually tagged cache. Any L1I cache miss request (virtual address) going out to L2 cache has to be translated to the physical address and requested to L2 cache.

The L1I cache controller also determines if the last predicted fetch indexes to a second page in the translation table. If this occurs, the L1I cache controller requests the next page translation table entry before it is needed. Typically the new page translation table entry will be complete or in progress when the program fetch address crosses into the next page. This reduces the latency for fetching the instructions in the second page.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
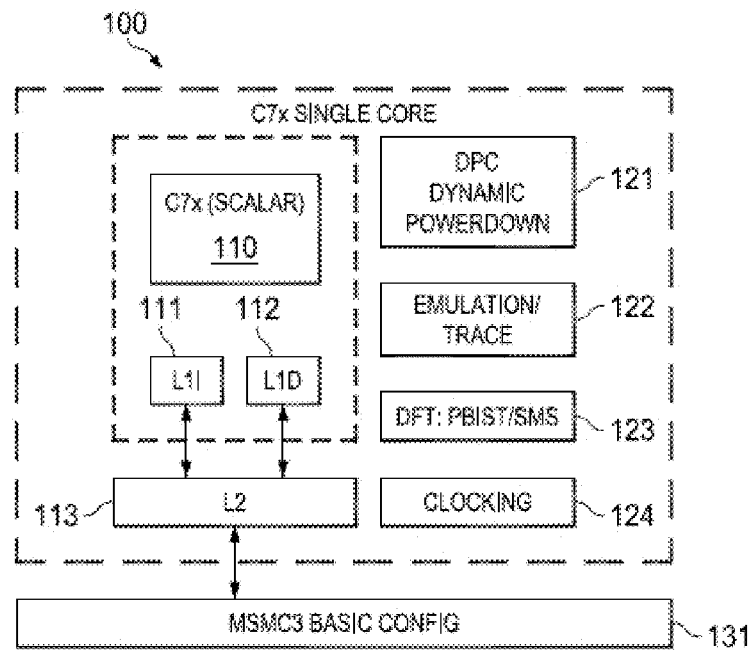
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
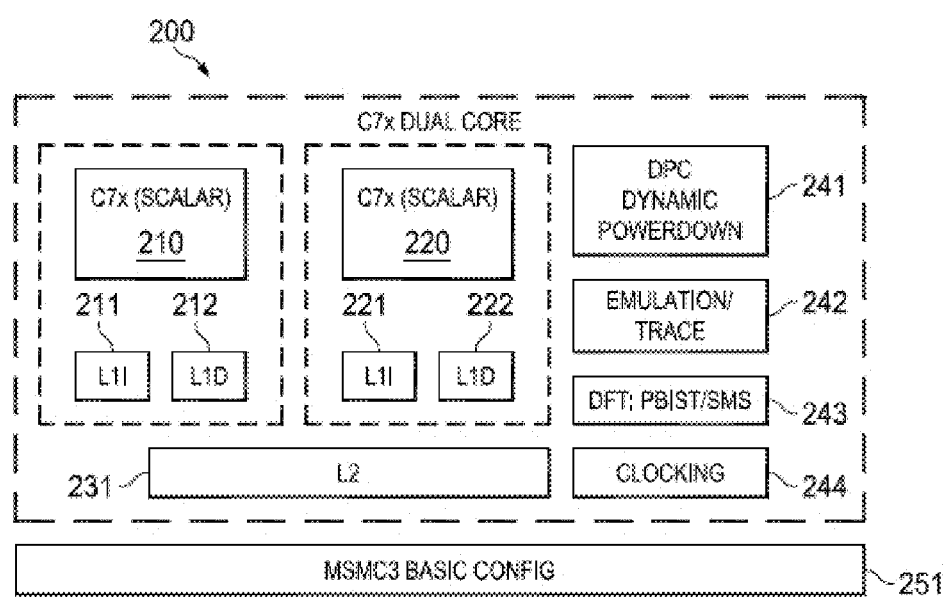
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
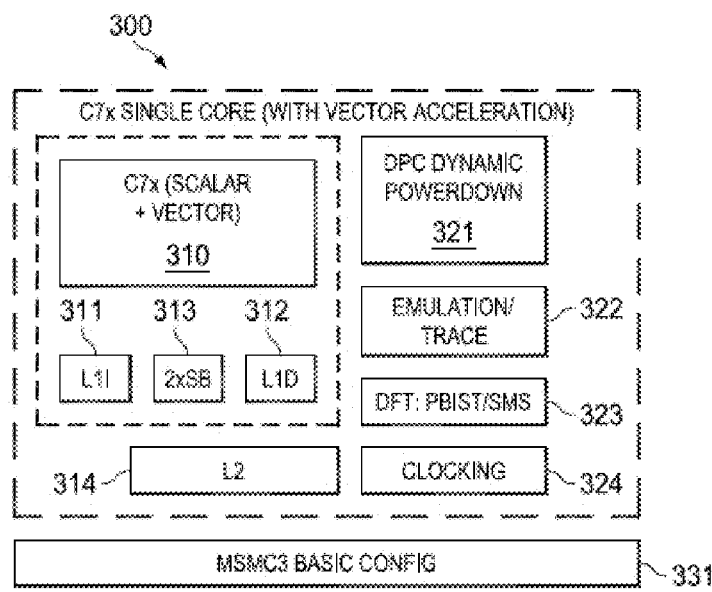
FIG. 3 illustrates a single core vector processor according to a further embodiment of this invention.
Figure 4:
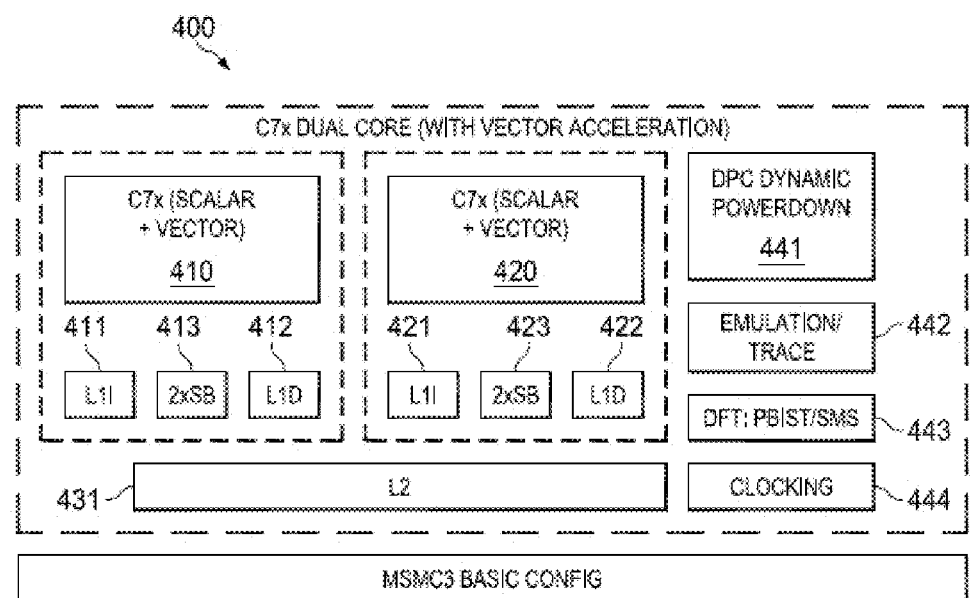
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
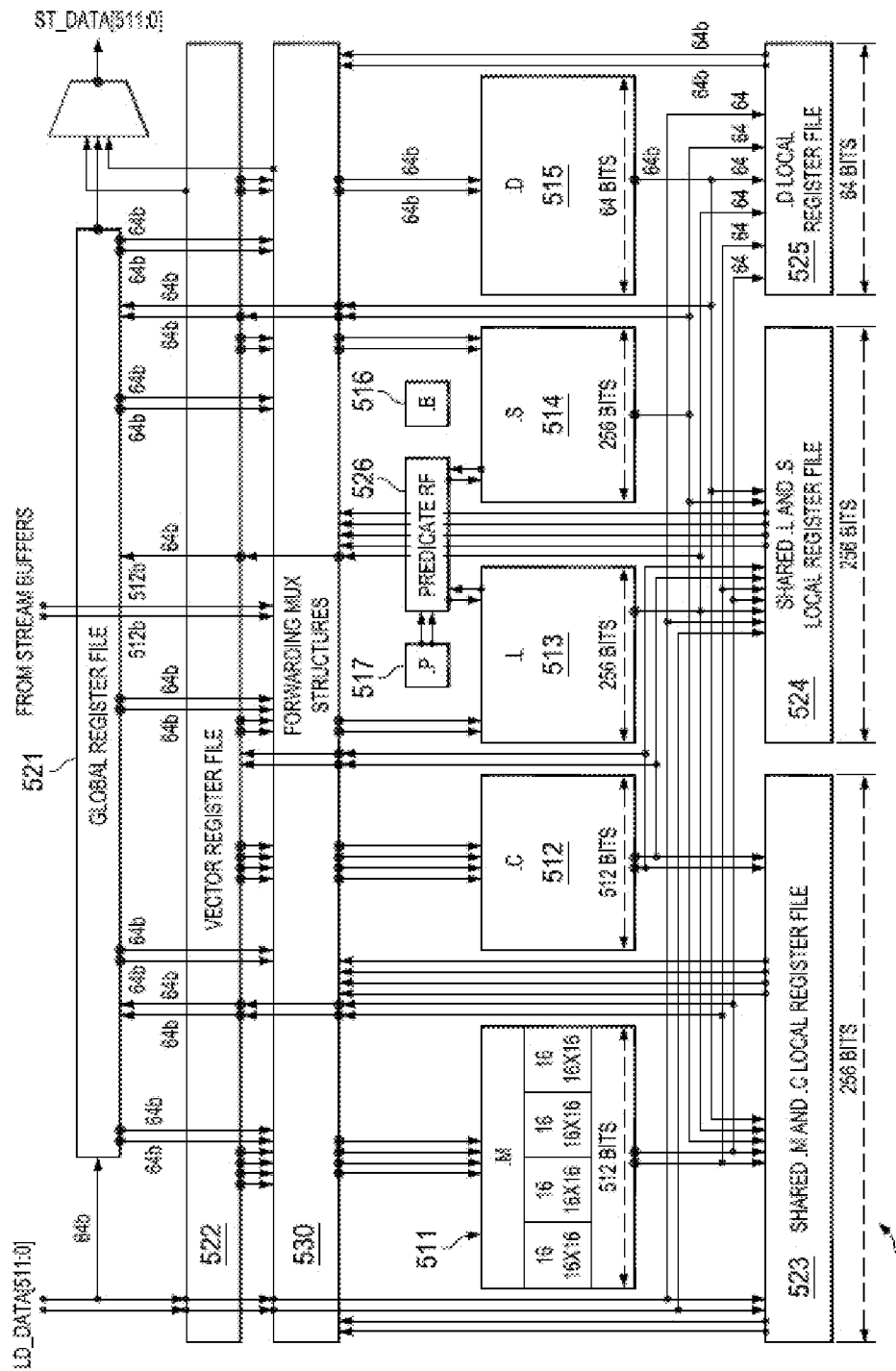
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. The permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below. In accordance with the preferred embodiment the CPU of FIG. 5 is a very long instruction (VLIW) CPU which fetches program fetch packets of sixteen instructions each instruction cycle. As described below these instructions may be executed by plural execution units in parallel during each instruction cycle.

Multiply unit 511 primarily preforms multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result.

Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table look-aside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
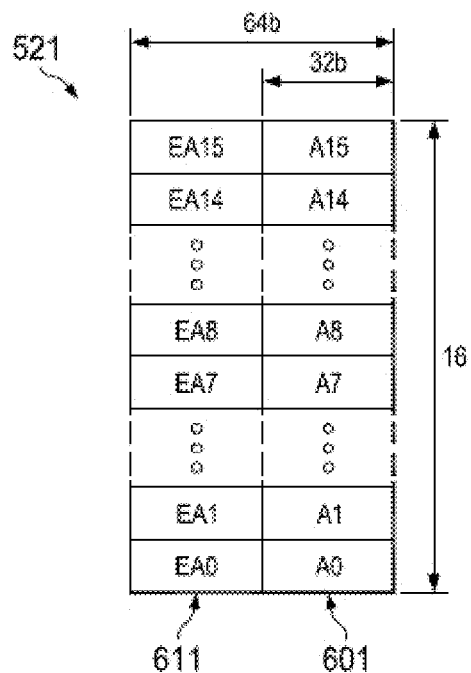
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
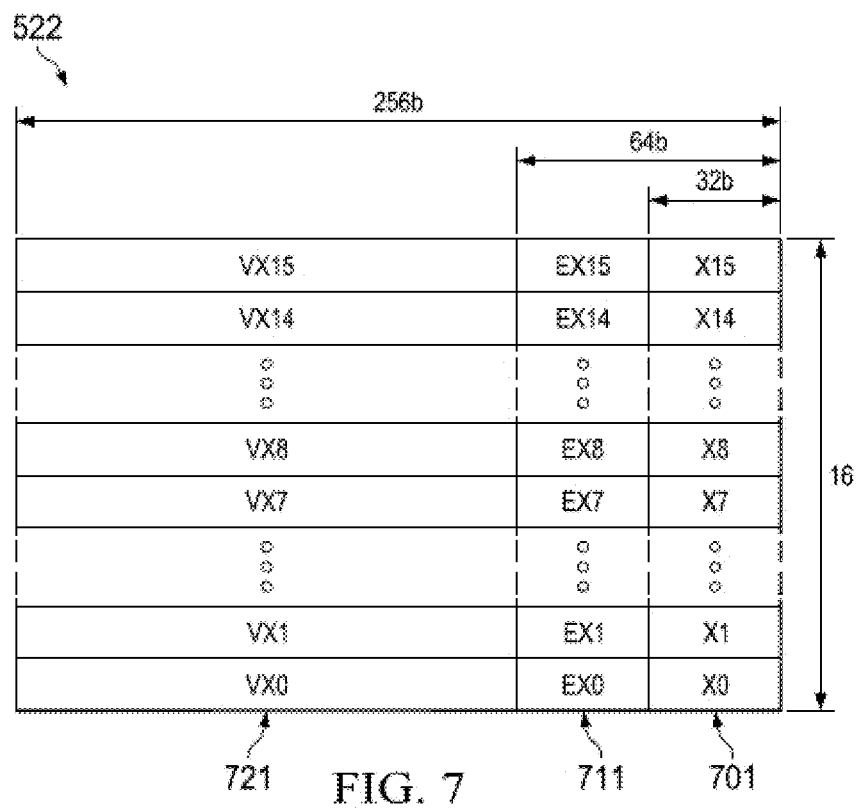
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

Figure 8:
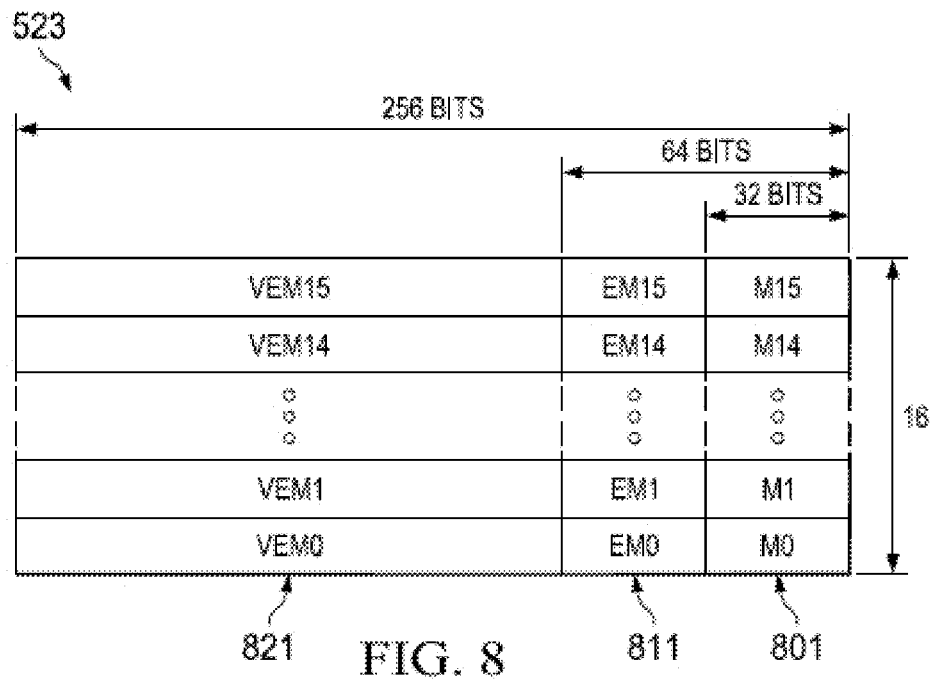
FIG. 8 illustrates the local vector register file shared by the multiply and correlation functional units.

FIG. 8 illustrates local vector register file 523. There are 16 independent 256-bit wide vector registers. Each register of local vector register file 523 can be read as 32-bits scalar data (designated registers M0 to M15 701), 64-bits of scalar data (designated registers EM0 to EM15 711), 256-bit vector data (designated registers VM0 to VM15 721) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

Figure 9:
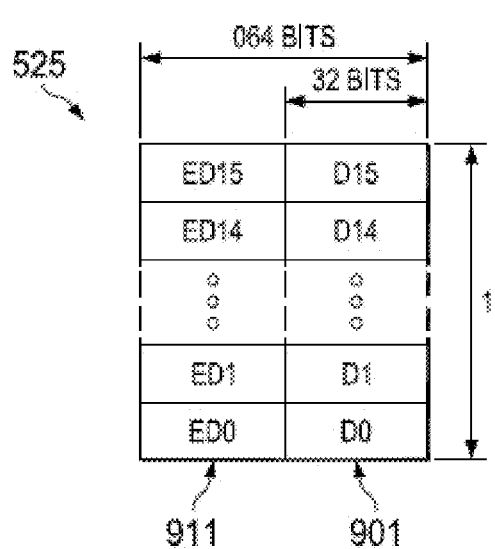
FIG. 9 illustrates local register file of the load/store unit.

FIG. 9 illustrates local register file 525. There are 16 independent 64-bit wide registers. Each register of local register file 525 can be read as 32-bits scalar data (designated registers D0 to D15 701) or 64-bits of scalar data (designated registers ED0 to ED15 711). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

Figure 10:
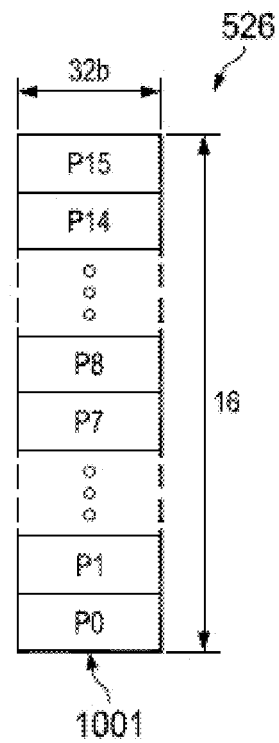
FIG. 10 illustrates the predicate register file.

FIG. 10 illustrates the predicate register file 517. There are sixteen registers 32-bit registers in predicate register file 517. Predicate register file 517 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 517. Transfers between predicate register file 517 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
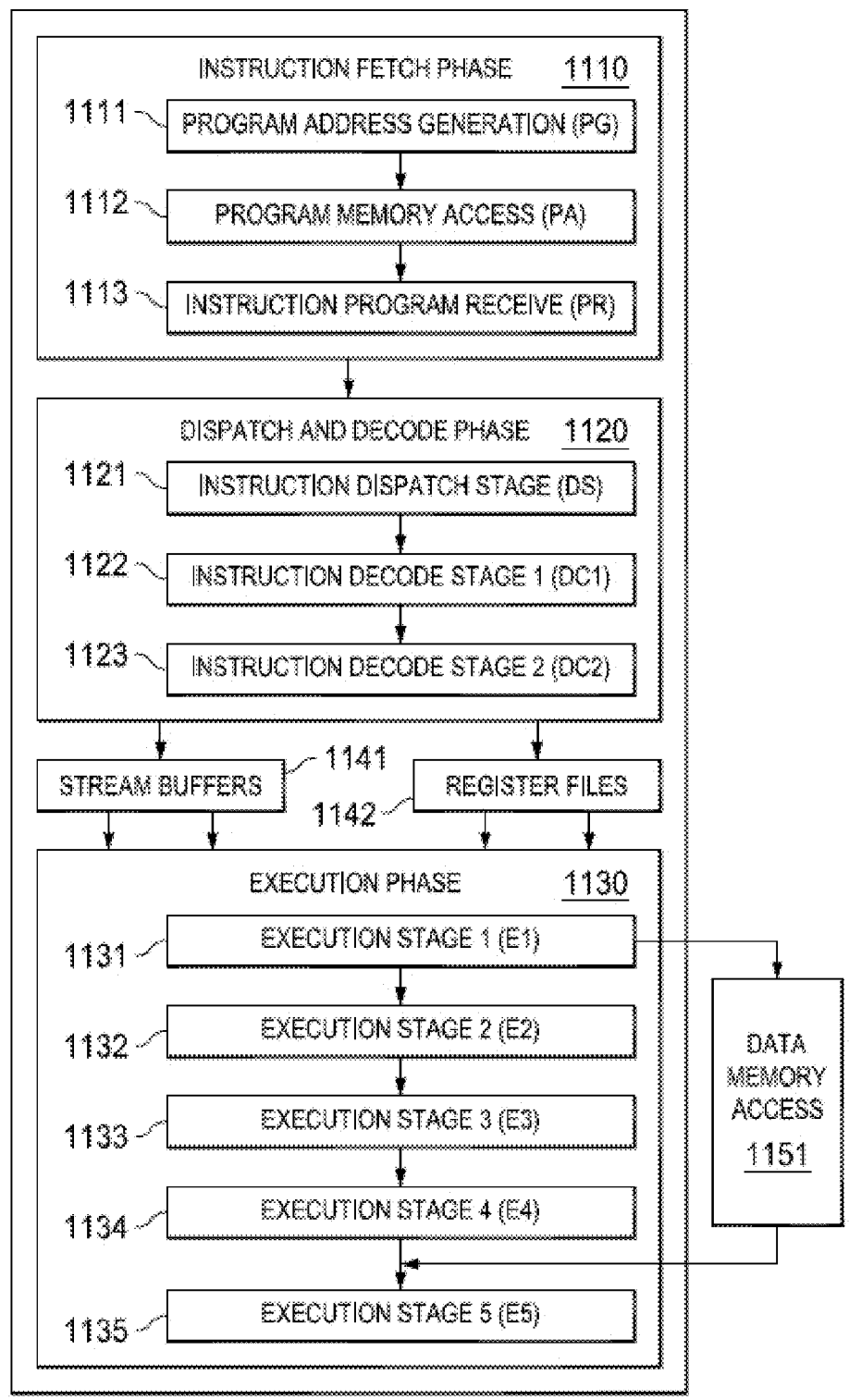
FIG. 11 illustrates the pipeline phases of the central processing unit according to a preferred embodiment of this invention.

FIG. 11 illustrates the following pipeline phases: program fetch phase 1110, dispatch and decode phase 1120 and execution phase 1130. Program fetch phase 1110 includes three stages for all instructions. Dispatch and decode phases include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
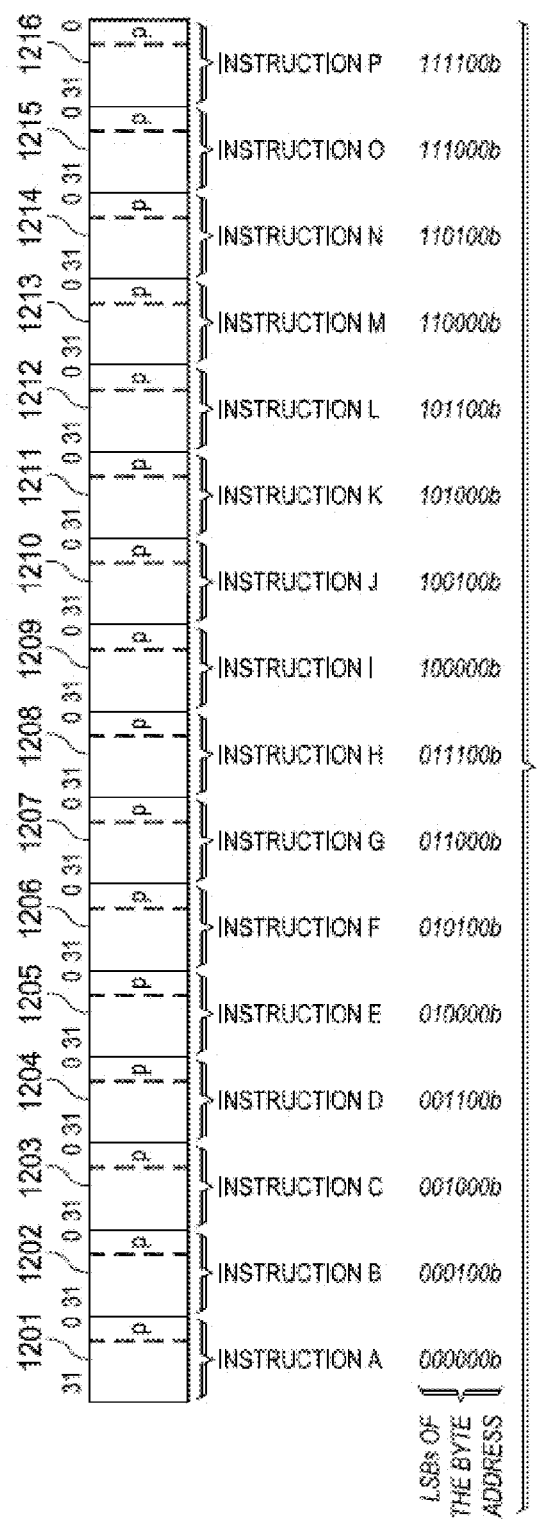
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phase 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
FIG. 13 illustrates an example of the instruction coding of instructions used by this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit creg/z fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 14:
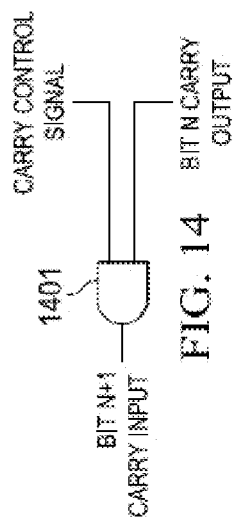
FIG. 14 illustrates the carry control for SIMD operations according to this invention.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals | | | | | | | |
|---|---|---|---|---|---|---|---|---|
| 8 bits | –000 | 0000 | 0000 | 0000 | 0000 | 0000 | 0000 | 0000 |
| 16 bits | –101 | 0101 | 0101 | 0101 | 0101 | 0101 | 0101 | 0101 |
| 32 bits | –111 | 0111 | 0111 | 0111 | 0111 | 0111 | 0111 | 0111 |

TABLE 4-continued

| Data Size | Carry Control Signals | | | | | | | |
|---|---|---|---|---|---|---|---|---|
| 64 bits | –111 | 1111 | 0111 | 1111 | 0111 | 1111 | 0111 | 1111 |
| 128 bits | –111 | 1111 | 1111 | 1111 | 0111 | 1111 | 1111 | 1111 |
| 256 bits | –111 | 1111 | 1111 | 1111 | 1111 | 1111 | 1111 | 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

This invention hides the page miss translation latency for many instruction fetches. In this invention whenever an access is requested by CPU, the L1I controller does an a-priori lookup of whether the virtual address plus the fetch packet count crosses a page boundary. If the access crosses a page boundary crossing, the L1I cache controller will request a second page translation entry along with the first page entry thus pipelining requests to the μTLB without waiting for L1I cache controller to begin processing the second page requests. This becomes a deterministic prefetch of the second page translation request. The address translation information for the second page is stored locally in L1I cache controller and used when the access crosses the page boundary.

In the preferred embodiment of this invention, the μTLB to MMU requests are pipelined. Whether the μTLB requests are pipelined or not, this scheme hides some page miss translation latency. This improves the program memory cache performance significantly.

Figure 15:
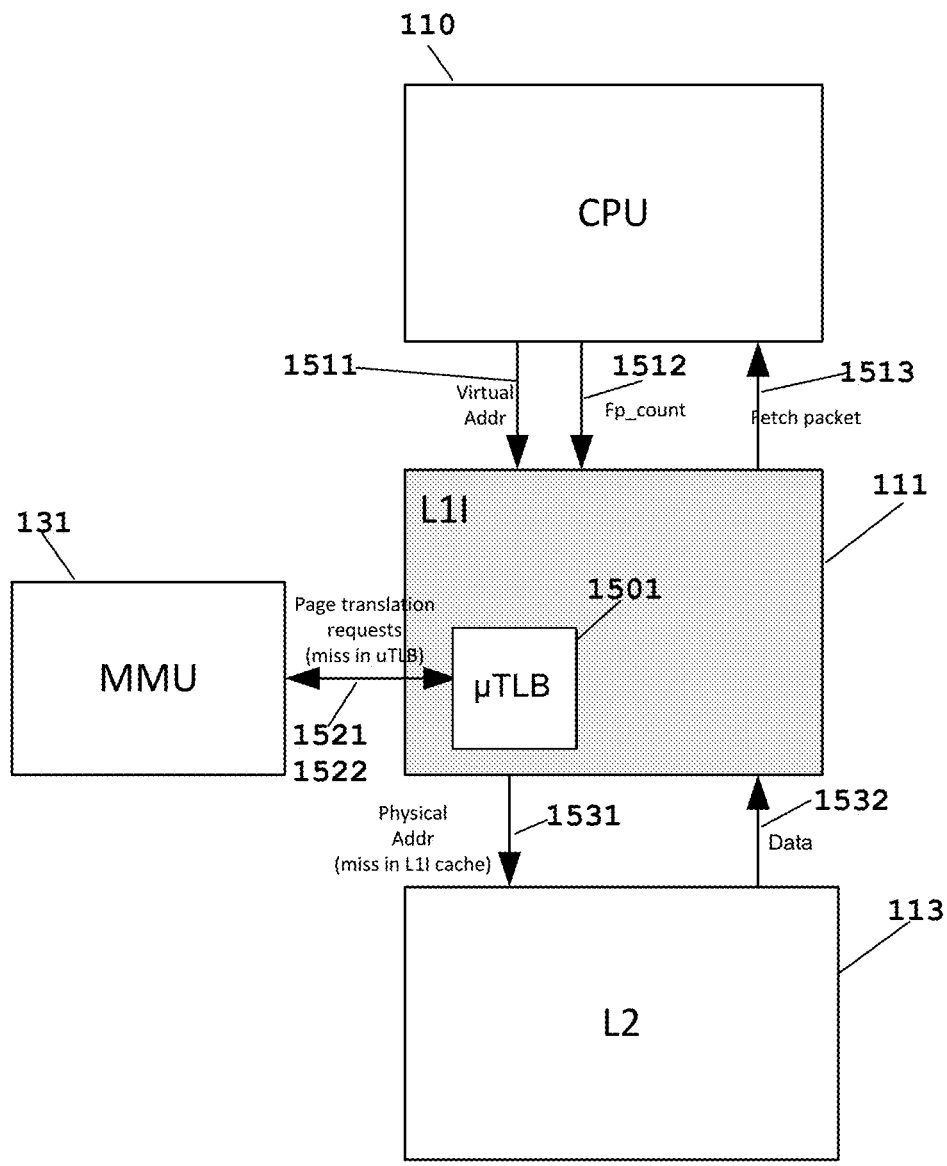
FIG. 15 illustrates the key parts of this invention.

FIG. 15 illustrates the key parts of this invention. FIG. 15 employs reference numerals from the scalar single core example of FIG. 1 for simplicity of illustration. Those skilled in the art would realize this invention could be practiced with any of the examples illustrated in FIGS. 1 to 4. In particular, this invention can be practiced with the dual processor examples illustrated in FIGS. 2 and 4 with the level two unified cache shared between the dual processors. Central processing unit (CPU) 110 is coupled to level one instruction cache (L1I) 111. Level one instruction cache 111 is further connected to memory management unit (MMU) 131 corresponding to the memory controller 131 in FIG. 1 and to L2 cache 113. FIG. 15 illustrates micro table look-aside buffer (μTLB) 1501 included as part of L1I cache 111. FIG. 15 illustrates the following signals passed between CPU 110 and L1I cache 111: virtual address 1511; fetch packet count 1512; and fetch packet 1513. FIG. 15 illustrates bidirectional data flow between L1I cache 111 and MMU 131 including: page translations entry requests 1521; and page translation entries 1522. FIG. 15 illustrates the following signals passed between L1I cache 111 and L2 cache 113; physical address 1531; and data 1532.

Figure 16:
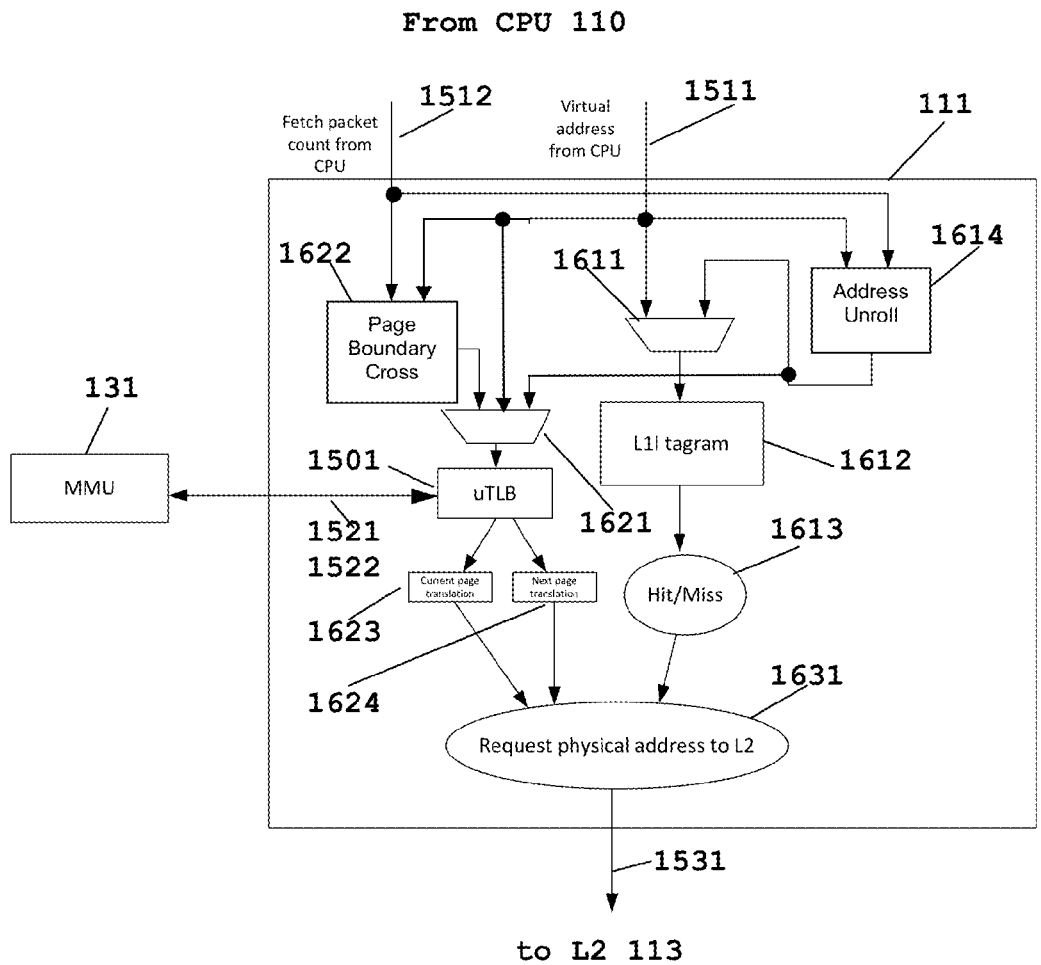
FIG. 16 illustrates the virtual to physical address translation of this invention.

The virtual to physical address translation operates as shown in FIG. 16. In this example CPU 110 operates employing a virtual address. L1I cache 111 also employs virtual addresses. L2 cache 113 employs physical addresses. Accesses to L2 cache 113 from CPU 110 must undergo address translation from a virtual address to a physical address. Note some parts of L1I cache 111 are omitted for clarity of illustration.

Upon a need for another fetch packet of instructions, CPU 110 supplies the virtual address 1511 of the needed fetch packet. Multiplexer 1611 supplies virtual address 1511 to L1I tag RAM 1612. L1I tag RAM 1612 compares virtual address 1511 to tags indicating which addresses are cached.

Hit/miss unit 1613 determines whether the virtual address accesses cached data (hit) or does not access cached data (miss). By its nature L1I cache 111 cannot contain all program instructions that may be used by CPU 110. L1I cache stores a limited subset of these program instructions. According to temporal and spatial locality principles, a CPU access to a memory location storing program instructions makes access to the same and nearby memory locations likely. If hit/miss unit 1613 determines the requested fetch packet is stored in L1I cache 113, then this fetch packet is supplied to CPU 110 from the L1I cache 111 data memory (not illustrated) via fetch packet 1513 (FIG. 15).

If hit/miss unit 1613 determines the requested fetch packet is not stored in L1I cache 111, then this fetch packet is requested from L2 cache 113. Because L1I cache 111 is virtually tagged and L2 cache 113 is physically tagged, this requires an address translation. At the same time the virtual address 1511 is supplied to L1I tag RAM 1612, the virtual address is also supplied to μTLB 1501 via multiplexer 1621. Address translation is typically performed using a table of most significant bits of virtual addresses and the corresponding most significant bits of physical addresses. In this example upon detecting the correct address pair, the address translation substitutes the most significant physical address bits for the most significant virtual address bits. It is typical that the least significant bits of the virtual address are the same as the least significant bits of the physical address. In this example the virtual address/physical address translation table is stored in MMU 131. In addition, L1I cache 111 includes μTLB 1501 which stores some of the address translation table entries in a cache-like fashion. When servicing an address translation, the requested virtual address 1511 is compared with address translation table entries stored in μTLB 1501. If virtual address 1511 matches a table entry in μTLB 1501, the matching table entry is used for address translation in current page translation 1623. Upon such a μTLB hit, current page translation 1623 performs the address translation in a single cycle. If virtual address 1511 does not match any table entry in μTLB 1501, then these address translation parameters must be fetched from the MMU 131. μTLB 1501 transmits page translation entry request 1521 for virtual address 1511 to MMU 131. It may require tens or hundreds of cycles to perform this fetch depending on the page translation and page table walk latency in the MMU. MMU 131 finds the corresponding address translation entry and returns this entry 1522 to μTLB 1501. μTLB 1501 stores this newly fetched translation entry, typically casting out an entry currently stored in μTLB 1501 to make room. Current page translation 1623 performs the address translation using the newly stored translation entry. Following address translation the physical address passes to L2 cache 113 via request physical address to L2 unit 1631. Note this request is conditional on hit/miss unit 1613 indicating a cache miss in L1I cache 111. Supply of a physical address to L2 cache 113 is not required when hit/miss unit 1613 indicates a hit, because this hit indicates the memory access can be serviced from L1I cache 111.

FIG. 16 illustrates a further refinement of this invention to reduce the latency occurring upon a miss in μTLB 1501. This technique utilizes information to predict a possible micro translation look-aside table miss before it occurs. For each instruction fetch CPU 110 generates both the fetch address and a predicted number of fetch packets to be accessed. This predicted number of fetch packets to be accessed is based on branch predictor logic in branch unit 516.

Branch prediction deals with a problem handling conditional branch instructions in a pipelined processor. Pipelining is a manner of handling instruction operation. Programmed operation requires fetching the next instruction, decoding the instruction, accessing operands, performing the operation and storing the result. A pipelined processor has differing hardware devoted to different aspects of executing an instruction. This division of tasks permits an assembly line like operation. Thus there will typically be plural instructions in the pipeline simultaneously in various stages of completion. This spread of instructions in progress may cause delays in executing conditional branch instructions. Instruction execution normally proceeds linearly through memory locations. Conditional branch instructions deviate from this linear progression based upon some current machine state. This machine state, such as the data stored in a register or the state of a status bit, is typically not known or knowable in advance of the conditional branch instruction. In many cases this machine state is a just calculated number. If a conditional branch is taken, the program flow changes. This means that the plural instructions in progress in the pipeline are the wrong instructions. The simple remedy is to abort these incorrect instructions in progress and restart the beginning of the pipeline correctly at the branch destination. This disruption in instruction flow is called a pipeline hit.

Branch prediction is used to minimize the number of such pipeline hits. Branch unit 516 makes prediction of whether a conditional branch will be taken or not taken. The instruction fetch sequence follows the predicted path. There is no program flow disruption or pipeline hit if a conditional branch instruction is correctly predicted. The pipeline hit on an incorrect prediction is the same as the pipeline hit on a taken branch without prediction. Branch prediction can be static or dynamic. An example of static prediction is predicting a branch is always taken if the branch destination is a short distance before the conditional branch instruction and predicting all other branches as not taken. This is based upon the theory that a short backward branch is from the tail to the head of a loop which will be executed repeatedly. Dynamic branch prediction takes into account the history of this conditional branch instruction. If the branch were taken the last one thousand times this conditional branch was executed, predicting the branch would be taken this instance seems reasonable. If the last four instances of this conditional branch instruction were taken, not taken, taken, not taken, then either prediction (taken/not taken) is as good as the other. Dynamic branch prediction may handle nested loops better than static branch prediction.

Branch prediction typically stores the memory address of each conditional branch instruction encountered in the program code as it executes. This enables branch unit 516 to recognize a conditional branch it has encountered. Associated with the conditional instruction address is the taken/not taken branch prediction and any branching history used in dynamic branch prediction. This branch prediction information will always be limited to a fairly small section of the program code due to limits in the amount of memory and circuits within branch unit 516. However, based upon the current instruction memory location and the predicted path through the program code due to branch prediction, branch unit 516 can determine the likely number of linearly following instructions or instruction fetch packets to be used after the current fetch packet access before a branch is predicted to be taken. This number is the fetch packet count 1512.

Figure 17:
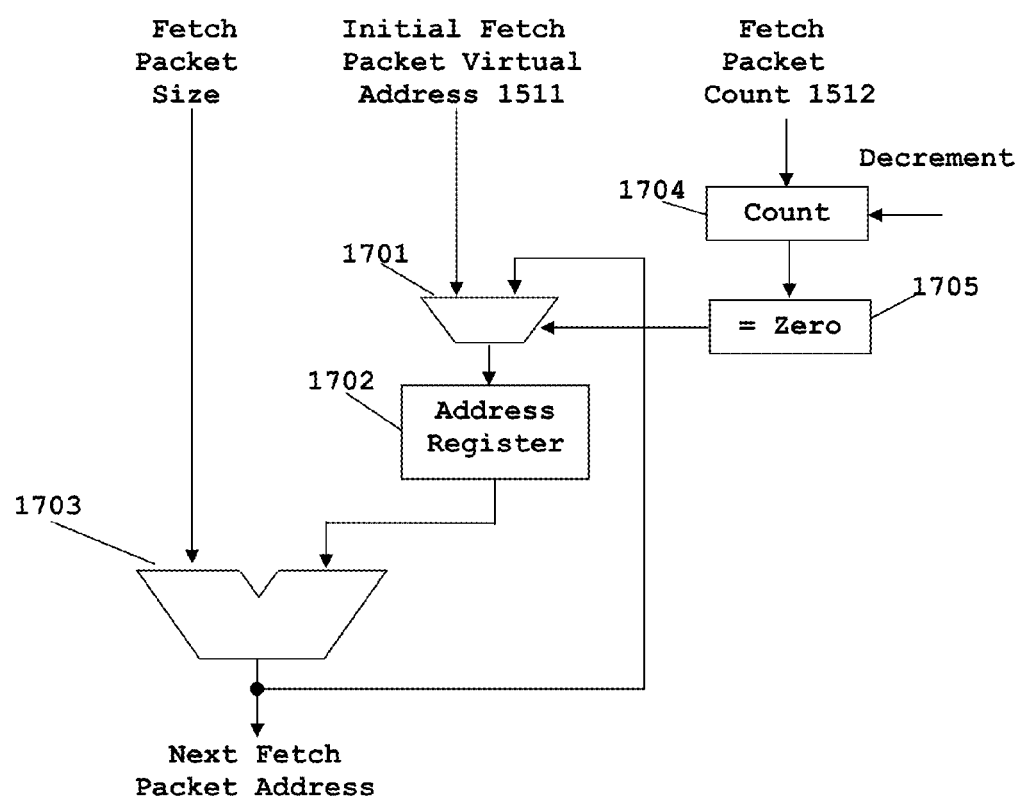
FIG. 17 illustrates an embodiment of an address unroll unit according to this invention.

FIG. 16 illustrates two uses of this predicted number of fetch packets 1512. Address unroll unit 1614 determines the address of each fetch packet in the linear sequence. FIG. 17 illustrates an embodiment of address unroll unit 1614. Upon supply of virtual address 1511 to address unroll unit 1614, multiplexer 1701 supplies this initial virtual address to address register 1702. Address register 1702 stores this address until the next memory cycle. Upon the following memory access cycle adder 1703 adds the contents of address register 1702 and the fetch packet size input. This fetch packet size input is the size in address bits of the fetch packet. In the preferred embodiment of this invention this fetch packet size is fixed at 16 instructions. In the preferred embodiment instructions are 32 bits of 4 bytes. In the preferred embodiment the memory is byte addressable, each address location corresponding to 8 bits/1 byte. Thus the fetch packet size in address bits is 16×4=48. The sum of address register 1702 and the fetch packet size is the address of the next fetch packet. Multiplexer 1611 supplies this address to L1I tag RAM 1612. L1I tag RAM 1612 compares the next fetch packet address from address unroll unit 1614 to tags determining whether the next address is cached. Hit/miss unit 1613 indicates the address is cached (hit) or not cached (miss). If the next fetch packet address is in L1I cache 111 (hit), no action is needed. If the next fetch packet address is not in L1I cache 111 (cache miss), then L1I cache 111 generates an instruction prefetch command. The next fetch packet address is coupled to μTLB 1501 via multiplexer 1621. At least initially the next fetch packet address will be on the same page as the initial virtual address 1511, generating a μTLB 1501 hit. Current page translation 1623 performs the address translation and supplies the corresponding physical address to L2 cache 111 via request physical address to L2 unit 1631. If the next fetch packet address hits the page following the initial page, next page translation unit 1624 preforms the address translation if the next address translation entry has been prefetched according to this invention. In either case this passes the L1I cache miss to L2 cache 113 for service.

Following initial loading of address register 1702 with the initial virtual address 1511, multiplexer 1701 switches inputs to load the just incremented address. During the next memory cycle adder 1703 generates another next fetch packet address. This new next fetch packet address is handled as describe above. Count register 1704 is initially loaded with the fetch packet count 1512. Count register 1704 is decremented each memory access cycle. When zero detect unit 1705 determines count register 1704 has decremented to zero, the enabled input to multiplier 1801 switches back to the virtual address 1511. Thus address unroll unit 1614 generates address for each fetch packet following the initial address until the predicted end of linear advance through memory addresses. This enables prefetch of all these fetch packets either by conformation the fetch packet is stored in L1I 111 or requesting it from L2 cache 113.

The second use of the predicted number of fetch packets 1512 involves detecting a page boundary crossing in the address translation. Page boundary cross unit 1622 determines if the predicted number of fetch packets starting at the current fetch address will cross a page boundary in the page translation table. As known in the art the address translation takes place on memory pages having a size corresponding to the number of least significant bits that are identical in the virtual address and the physical address. The current fetch address points to one page of the address translation table. The end address of the last predicted fetch packet may point to the same page or to a following page.

Figure 18:
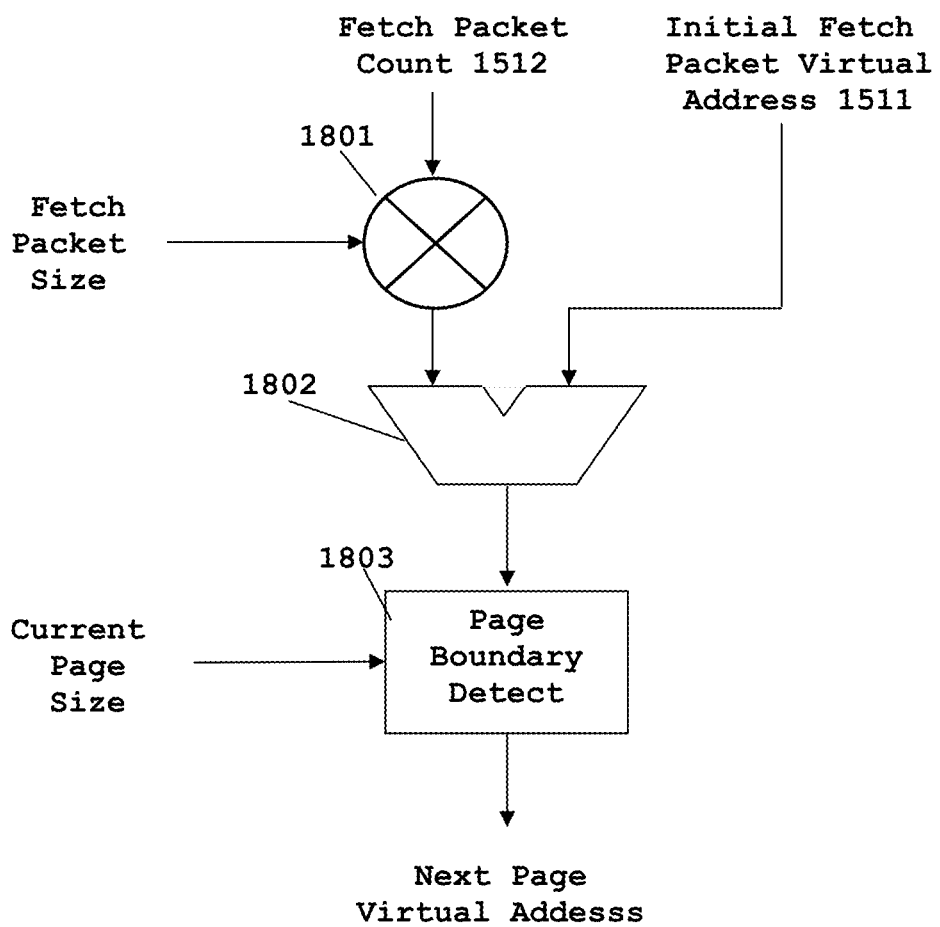
FIG. 18 illustrates an embodiment of a page boundary cross unit according to this invention.

FIG. 18 illustrates page boundary cross unit 1622. Multiplier 1801 multiples the fetch packet size determined as described above by the fetch packet count 1512. Adder 1802 adds this product to the virtual address 1511 from CPU 111. This computes the address of the last fetch packet in the linear progression though memory. Page detect unit 1803 receives this last fetch packet address and an indication of the current page size. It is known in the art that address translation may be based upon pages of fixed or variable size. Page detect unit 1803 determines whether the last fetch packet address is on the same page or a next page of the virtual address 1511. If page boundary cross unit 1622 indicates a page boundary crossing multiplexer 1621 supplies a signal to μTLB 1501 to access the page following the page of the initial virtual address. Upon a hit of this address, μTLB 1501 submits the physical address from next page translation 1624 to L2 cache 113 via request physical address to L2 unit 1631 if hit/miss unit 1613 indicates a cache miss. No access to L2 cache 113 is needed if hit/miss unit 1613 indicates a hit in L1I cache 111.

If the next page from page boundary cross unit 1622 does not match any table entry in μTLB 1501, then the next page translation parameters must be fetched from the MMU 131. In such a case the next page address is passed to MMU 131 via page translations entry requests 1521. MMU 131 finds the corresponding address translation entry and returns this entry to μTLB 1501 via page translation entries 1522. μTLB 1501 stores this newly fetched address translation entry, typically casting out an entry currently stored in μTLB 1501 to make room. This stores the address translation entry for the next page in μTLB 1501. When the instruction fetch reaches this next page, there is a hit in μTLB 1501. Next page translation 1624 performs the address translation. Following address translation the physical address passes to L2 cache 113 via request physical address to L2 unit 1631. Note this request is conditional on hit/miss unit 1613 indicating a cache miss in L1I cache 111.

As noted above in the preferred embodiment of this invention the μTLB 1501 to MMU 131 requests are pipelined. In addition, preferably the page translation entries 1522 returned from MMU 131 to μTLB 1501 need not be in the same order as the page translations entry requests 1521 sent from μTLB 1501 to MMU 131. In the preferred embodiment the interface between MMU 131 and μTLB 1501 can handle plural requests simultaneously (pipelined). The organization of MMU 131 may cause different latency for different page table entries. MMU 131 preferably tracks the page translations entry request 1521 corresponding to a returned page translation entry 1522. This permits μTLB 1501 to match the returned page translation entry 1522 to the corresponding page translations entry request 1521. This enables μTLB 1501 to handle out-of-order returned page translation entries 1522.

Figure 19:
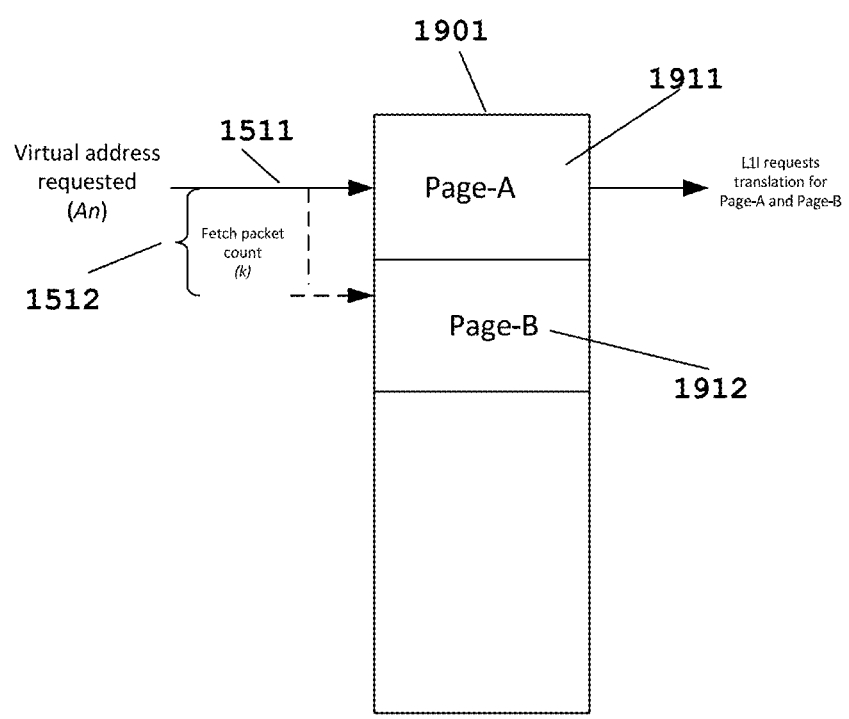
FIG. 19 schematically illustrates operation of this invention.

FIG. 19 schematically illustrates operation of this invention. CPU 110 generates an instruction fetch address 1511 and fetch packet number 1512. In this example fetch address 1511 points to page A 1911 in memory map 1901. As shown in FIG. 19 instruction fetch address 1511 and fetch packet number 1512 are such that the predicted memory access crosses the page boundary between page A 1911 and page B 1912. Upon this determination μTLB 1501 requests page translation entries for both page A 1911 and page B 1912. This means that if the path through the program code crosses the page boundary, the page translation table entry for that new page (page B 1912) is already stored in μTLB 1501. Latency for fetching the page translation table entry for the new page is hidden by the early fetch.

This invention determines from the predicted number of fetch packets to be accessed from branch predictor logic whether the program will generate a page miss. Upon such a detection, the µTLB 1501 requests the page translation table entry for the expected page access that will generate the miss. This page translation table entry is thus requested before CPU 110 actually accesses the fetch packet in the next page. The page translation table entry fetch may require a long time to service. In addition the time to complete this page translation table entry fetch may be highly variable in a manner not visible to CPU 110. Thus early request under circumstances where a miss to µTLB 1501 is predicted is advantageous. The part of the µTLB 1501 miss latency between the detection of the predicted page boundary crossing and the actual page boundary crossing corresponding to a CPU 110 instruction request is thus hidden in this invention. This invention may also prefetch the instruction at the address generating the expected page miss. Thus the fetch packet generating the page miss may be available before the actual page miss.

If the access prediction is incorrect and the program does not access the second page, then this invention performs an unneeded page translation table entry fetch. This is not expected to degrade system performance. Incorrect prediction of access to the second page would generally occur upon an incorrectly predicted program branch. In such a case the program typically branches to a page different from the page of the original access and the next page. A page miss caused by such a branch is likely. The unneeded fetch of the second page translation table entry of this invention would be unrelated to the incorrectly predicted branch page miss. Accordingly, this invention will typically not degrade performance in the case of an incorrect branch prediction.

Note that due to differences in replacement methods, µTLB 1501 may not store page translation table entries for all program instructions stored in L1I 111. Thus it is possible for a particular instruction access to generate any of the four combinations of L1I hit/miss and µTLB 1501 next page hit/miss. Table 5 lists the actions taken in a preferred embodiment of this invention.

TABLE 5

| µTLB next page | L1I | Action |
|---|---|---|
| miss | miss | Prefetch page table entry and instructions |
| miss | hit | Prefetch page table entry |
| hit | miss | Prefetch instructions |
| hit | hit | No Action |

The instruction prefetch is optional in this invention. Servicing a miss in L1I cache 111 is expected to generally require less time and have less variability than servicing a page entry miss in µTLB 1501. Thus there is less need for instruction prefetch as for the page translation table entry prefetch.

This invention determines if a second page translation entry will eventually be requested from µTLB and prefetches it before the first address belonging to this second page is requested by L1I cache controller. Some or all of the miss latency of second page translation entry fetch is thus hidden. This reduces the stall cycles, which improves the IPC (instructions per cycle) execution metric of the CPU.

This invention has been described as applicable to fetch packets in accordance with the very long instruction work (VLIW) CPU of the preferred embodiment illustrated in FIG. 5. Those skilled in the art would realize this invention is equally applicable to CPUs which fetch single instructions per cycle. In that event, the number of fetch packets from the branch prediction hardware of the CPU is a number of instructions because the number of instructions in a fetch packet is 1.

This invention is described in conjunction with the preferred embodiment translating virtual addresses to physical addresses. Those skilled in the art would recognize this invention is equally applicable to the opposite translation from a physical address to a virtual address. This invention enables enhanced translation from a first address domain to a second address domain when crossing a page boundary is predicted.

This invention is described in conjunction with the preferred embodiment of instruction fetch. Instruction fetch ordinarily takes place linearly, in contrast to data fetch which has no general pattern. It is expected to be easier to predict crossing a page boundary for instruction fetch than for data fetch. Nevertheless this invention in certain limited circumstances may be valuable for data fetch.

What is claimed is:

1. A method of address translation comprising the steps of:

receiving a first address of a memory access in a first address domain;

receiving an indication of a number of predicted sequential memory accesses linearly following said first address;

storing in a memory management unit a plurality of address translation entries, each address translation entry including a first predetermined number of most significant address bits of said first address domain and a corresponding second predetermined number of most significant address bits of a second address domain for a corresponding address page;

storing in a micro translation look-aside buffer a subset of the address translation entries stored in the memory management unit;

searching a micro translation look-aside buffer for a first address translation entry corresponding to said first address;

if said first address translation entry is not stored in said micro translation look-aside buffer recalling said first address translation entry from the memory management unit, and storing said recalled first address translation entry in the micro translation look-aside buffer;

translating said first address to a second address in a second domain according to said first address translation entry by substituting said second predetermined most significant bits of said second address domain for said first predetermined most significant bits of said first address domain of the first address translation entry;

determining from said first address and said indication of said number of predicted sequential memory accesses linearly following said first address whether a last of said number of predicted sequential memory accesses corresponds to a next address translation entry following said first address translation entry;

if said last of said number of predicted sequential memory accesses corresponds to a next address translation entry following said first address translation entry, searching the micro translation look-aside buffer for said next address translation entry; and if said next address translation entry is not stored in said micro translation look-aside buffer
recalling said next address translation entry from the memory management unit, and
storing said recalled next address translation entry in the micro translation look-aside buffer.

2. The method of address translation of claim 1, wherein:
said memory access in the first address domain is an instruction fetch;
further comprising predicting whether conditional branch instructions take a branch or do not take a branch;
further comprising determining said indication of a number of predicted sequential memory accesses linearly following said first address dependent upon a number of address locations between said first address and a next sequential conditional branch instruction predicted to be taken.

3. The method of address translation of claim 1, wherein:
said memory access in said first address domain is an instruction fetch of a fetch packet of consecutive instructions;
said indication of a number of predicted sequential memory accesses linearly following said first address is a number of fetch packets.

4. The method of address translation of claim 3, wherein:
said step of determining whether a last of said number of predicted sequential memory accesses corresponds to said next address translation entry includes
multiplying said number of fetch packets by a size of said fetch packets forming a product,
adding said product to said first address forming a sum address, and
determining whether said sum address corresponds to said next address translation entry.

5. The method of address translation of claim 4, wherein:
said step of determining whether said sum address corresponds to said next address translation entry includes
receiving an indication of a current page size of said first address translation entry.

6. The method of address translation of claim 1, further comprising:
temporarily storing data for a subset of memory addresses in a cache;
searching the cache for each received first address of a memory access for data corresponding to said first address;
if the cache stores data corresponding to said first address, servicing a memory access for said first address from the cache;
if the cache does not store data corresponding to said first address
recalling said data corresponding to said first address from the memory including said step of translating said first address to a second address in said second domain according to said first address translation entry,
storing said recalled data corresponding to said first address in the cache, and
thereafter servicing the memory access for said first address from the cache;
wherein said steps of recalling said first address translation entry from a memory management unit and storing said recalled first address translation entry in the micro translation look-aside buffer if said first address translation entry is not stored in said micro translation look-aside buffer are executed only if the cache does not store data corresponding to said first address.

7. The method of address translation of claim 6, wherein:
said memory access in a first address domain is an instruction fetch;
said memory access in said first address domain is an instruction fetch of a fetch packet of consecutive instructions;
said indication of a number of predicted sequential memory accesses linearly following said first address is a number of fetch packets;
further comprising generating a first next packet address by adding a fetch packet size to said first address;
generating a sequence of next fetch addresses by sequentially adding a fetch packet size to a prior next packet address; and
prefetching instructions at each next packet address.

8. The method of address translation of claim 7, wherein:
said step of prefetching instructions at each next packet address includes
searching the cache for each next packet address for instructions corresponding to said next packet address,
if the cache does not store instructions corresponding to said next packet address
recalling said data corresponding to said next packet address from a memory including said step of translating said next packet address to a third address in said second domain according to said first address translation entry,
storing said recalled instructions corresponding to each next packet address translation entry in the cache.

9. The method of address translation of claim 1, wherein:
said step of recalling said next address translation entry from the memory management unit includes
supplying said first address to the memory management,
recalling an address translation entry corresponding to said first address from the memory management unit,
returning said recalled address translation entry from the memory management unit to the micro translation look-aside buffer together with an indication corresponding to said first address, whereby the micro translation look-aside buffer may properly store an out-of-order recalled address translation entry.

10. A data processing apparatus employing address translation comprising:
a central processing unit performing data processing operations upon data under instruction control, said central processing unit generating memory accesses at corresponding first addresses in a first address domain and an indication of a number of predicted sequential memory accesses linearly following said first address for each memory access;
a memory management unit storing a plurality of address translations entries, each address translation entry including a first predetermined number of most significant address bits of said first address domain and a corresponding second predetermined number of most significant address bits of a second address domain for a corresponding address page;
an address translation unit connected to said central processing unit and said memory management unit, said address translation unit including a micro translation look-aside buffer storing a subset of said plurality of address translations entries, said address translation unit operable to translate memory accesses from said central processing unit from said first address domain to a second address domain by searching said micro translation look-aside buffer for a first address translation entry corresponding to a current first address;

if said first address translation entry is not stored in said micro translation look-aside buffer recalling said first address translation entry from a memory management unit, and storing said recalled first address translation entry in the micro translation look-aside buffer;

translating said first address to a second address in a second domain according to said first address translation entry by substituting said second predetermined most significant bits of said second address domain for said first predetermined most significant bits of said first address domain of said first address translation entry;

said address translation unit operable to determine from said first address and said indication of said number of predicted sequential memory accesses linearly following said first address whether a last of said number of predicted sequential memory accesses corresponds to a next address translation entry following said first address translation entry, if said last of said number of predicted sequential memory accesses corresponds to a next address translation entry, search the micro translation look-aside buffer for said next address translation entry, and if said next address translation entry is not stored in said micro translation look-aside buffer recall said next address translation entry from said memory management unit, and store said recalled next address translation entry in the micro translation look-aside buffer.

11. The data processing apparatus employing address translation of claim 10, wherein:

said memory accesses in the first address domain are instruction fetches;

said central processing unit includes a branch prediction unit, said branch prediction unit operable to store a prediction whether a conditional branch instruction takes a branch or do not take a branch, and calculate said indication of a number of predicted sequential memory accesses linearly following said first address dependent upon a number of address locations between said first address and a next sequential conditional branch instruction predicted to be taken.

12. The data processing apparatus employing address translation of claim 10, wherein:

said central processing unit is a very long instruction word central processing unit including plural functional units, wherein said memory accesses in said first address domain are instruction fetches of a fetch packet of consecutive instructions, and said indication of a number of predicted sequential memory linearly following said first address accesses is a number of fetch packets.

13. The data processing apparatus employing address translation of claim 12, wherein:

said address translation unit further includes a multiplier having a first input receiving said number of fetch packets, a second input receiving a size of said fetch packets and an output forming a product, an adder having a first input connected to said output of said multiplier, a second input receiving said first address and an output forming a sum address, and a page boundary detect unit having a first input connected to said output of said adder determining whether said sum address corresponds to said next address translation entry.

14. The data processing apparatus employing address translation of claim 13, wherein:

said page boundary detect unit further includes a second input receiving an indication of a current page size of said first address translation entry.

15. The data processing apparatus employing address translation of claim 10, further comprising:

a cache temporarily storing data for a subset of memory addresses, said cache operable to search for each received first address of a memory access for data corresponding to said first address;

if said cache stores data corresponding to said first address, service said memory access for said first address from said cache;

if said cache does not store data corresponding to said first address recall said data corresponding to said first address from a memory including said address translation unit translating said first address to a second address in a second domain according to said first address translation entry, store said recalled data corresponding to said first address translation entry, and thereafter service the memory access for said first address from the cache;

said address translation unit operable to recall said first address translation entry from said memory management unit and store said recalled first address translation entry in said micro translation look-aside buffer only if said cache does not store data corresponding to said first address.

16. The data processing apparatus employing address translation of claim 15, wherein:

said central processing unit generates instruction fetches of a fetch packet of consecutive instructions as said memory accesses, and generates a number of fetch packets as said indication of a number of predicted sequential memory accesses linearly following said first address;

said address translation unit further includes a fetch packet count register initially loaded with said number of fetch packets and decremented each memory cycle, a multiplexer having a first input connected to said central processing unit receiving said first address, a second input, an output and a control input connected to said zero count unit receiving said zero count indication, a zero count unit connected to said fetch packet count register generating a zero count indication of whether a count of said fetch packet count register is zero, said zero count indication connected to said control input of said multiplexer selecting said first input of said multiplexer upon an indication of zero and selecting said second input of said multiplexer upon an indication of not zero, and an adder having a first input receiving an indication of a fetch packet size, a second input connected to said output of said multiplexer and an output generating a sum address, said output connected to said second input of said multiplexer, said sum address generating a cache prefetch request.

17. The data processing apparatus employing address translation of claim 16, wherein:
said cache is further operable to
search for each received cache prefetch address for data corresponding to said cache prefetch address,
if said cache does not store data corresponding to said cache prefetch address
recall said data corresponding to said cache prefetch address from the memory including said address translation unit translating said cache prefetch address to a third address in said second domain according to said first address translation entry,
store said recalled data corresponding to said cache prefetch address.

18. The data processing apparatus employing address translation of claim 10, wherein:
said memory management is further operable to return said recalled first address translation entry to the micro translation look-aside buffer together with an indication corresponding to said first address; and
said micro translation look-aside buffer stores said recalled first address translation entry in a location corresponding to said first address, whereby said micro translation look-aside buffer may properly store an out-of-order recalled address translation entries.

* * * * *